(12) United States Patent
Inman et al.

(10) Patent No.: US 6,640,103 B1
(45) Date of Patent: Oct. 28, 2003

(54) METHOD AND SYSTEM FOR CELLULAR SYSTEM BORDER ANALYSIS

(75) Inventors: Dwight Inman, Plano, TX (US); Aileen Rivera-Villarreal, Plano, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/447,143

(22) Filed: Nov. 23, 1999

(51) Int. Cl.[7] ................................................ H04Q 7/20
(52) U.S. Cl. .................... 455/446; 455/422.1; 455/436
(58) Field of Search ................................ 455/446, 422, 455/436, 429, 453

(56) References Cited

U.S. PATENT DOCUMENTS

| | | | | |
|---|---|---|---|---|
| 5,920,607 A | * | 7/1999 | Berg ........................... | 370/241 |
| 6,128,500 A | * | 10/2000 | Raghavan et al. ........... | 370/335 |
| 6,295,451 B1 | * | 9/2001 | Mimura ...................... | 455/436 |
| 6,304,754 B1 | * | 10/2001 | DeSantis et al. ............ | 455/422 |

* cited by examiner

*Primary Examiner*—Lee Nguyen
*Assistant Examiner*—Tsuleun Richard Lei

(57) ABSTRACT

Methods and systems for determining switch assignment within wireless communication regions served by plural telecommunication equipment. Telecommunication switch borders may be re-defined based on system use patterns and data. Cellular antennas and/or base stations may be reassigned to switches based on use data. A region comprising a plurality of switches and cell sites in need of border optimization may be identified (401). Cell traffic statistical data collected 402 for cellular sites may be utilized in the analysis (403). Latitude and longitude information for each cell being studied may be identified (402) and used. Contours defining an optimized region are generated (404) using the statistical and/or lat/long information for equipment. Switches, cellular antennas and/or base stations may be reassigned based on the optimized region.

21 Claims, 4 Drawing Sheets

METHOD AND SYSTEM FOR CELLULAR SYSTEM BORDER ANALYSIS

TECHNICAL FIELD OF THE INVENTION

The invention is related to wireless communications. More particularly, the invention is related to methods of analyzing wireless network data for optimizing system border placement.

BACKGROUND

Wireless mobile communications networks provide service to customer through the use of antennas. Groups of transmit and receive antennas are defined and may be referred to as a cell. Each cell covers a geographical region in which a customer can access the services of the communications network. A group of cells are controlled by a switch that performs the necessary routing of calls and services. Depending on the number of cells, a wireless network may consist of several switches.

In a wireless network, performance data and statistics can be collected on a device, cell or system basis for use in analyzing system performance. Performance data may include, but is not limited to, signal coverage, signal quality, successful or failed cell events, etc. Normally, such data is subsequently downloaded from the local storage media to an off-line processing tool. The data is usually displayed in charts, graphs and, at times, on maps for use in performance-based analysis.

Using charts and graphs is a convenient method for analyzing data in that statistical analysis can performed relatively easy on data in these formats. However, the correlation of performance data with the geographical location of cells in the system and with respect to public and private infrastructure in the service area in not possible with present formats. To overcome this inability, maps are used to plot the location of cells and represent the value of a function of parameters on a point basis.

Even though service is provided through a cell that has a single latitude and longitude, the customer could be elsewhere in the area covered by this cell. However, with the current use of maps, performance data is not distributed to locations away from the cell itself.

In addition, the maps may show the current status of a network by representing the values of network performance data, but displaying the development of performance data as function of time is not possible through a single-frame map.

SUMMARY OF THE INVENTION

Methods and/or systems that minimize hand-offs occurring between heavily used switches, thereby enhancing wireless service processing time and wireless system capacity would be desirable. What is apparently needed are methods and systems that can provide graphically distributed and temporal representations of wireless network data to assist wireless stewards in the analyzing of wireless network parameters and the development of wireless network characteristics.

The present invention provides cellular system designers and planners (hereafter referred to as "stewards") a method for determining switch assignments within regions served by plural switches. With the present invention, stewards can redefine switch borders based on system use data and/or patterns. Stewards may more effectively reassign cellular antennas to switches and/or base stations, and/or base stations to switches, using the method provided herein.

One aspect of the present invention provides a method of redefining switch borders within a wireless telecommunication system. In accordance with the method, a region comprising a plurality of switches and cell sites in need of border optimization is identified. Statistical data is collected for cellular sites. Contours defining wireless traffic within a region are generated using the statistical data and latitude/longitude information. Cellular site and switch assignments and/or reassignments are determined based on resulting contour information.

The statistical information may include data related to hand-offs into and out of the a cell antenna and/or a switch within a cellular network. Generation of contours defining a region comprise data needed for determining a redistribution of cell sites to switches within an investigated region.

Another aspect of the invention provides a system wherein a microprocessor is programmed to analyze statistical and identifying information (e.g., hand-off data, and/or lat/long info) for telecommunication equipment within a defined region. A means for rendering traffic contours within the identified region based on the identifying and/or statistical information generates contours using analytical results from the microprocessor.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF PREFERRED EMBODIMENTS

Figure 1:
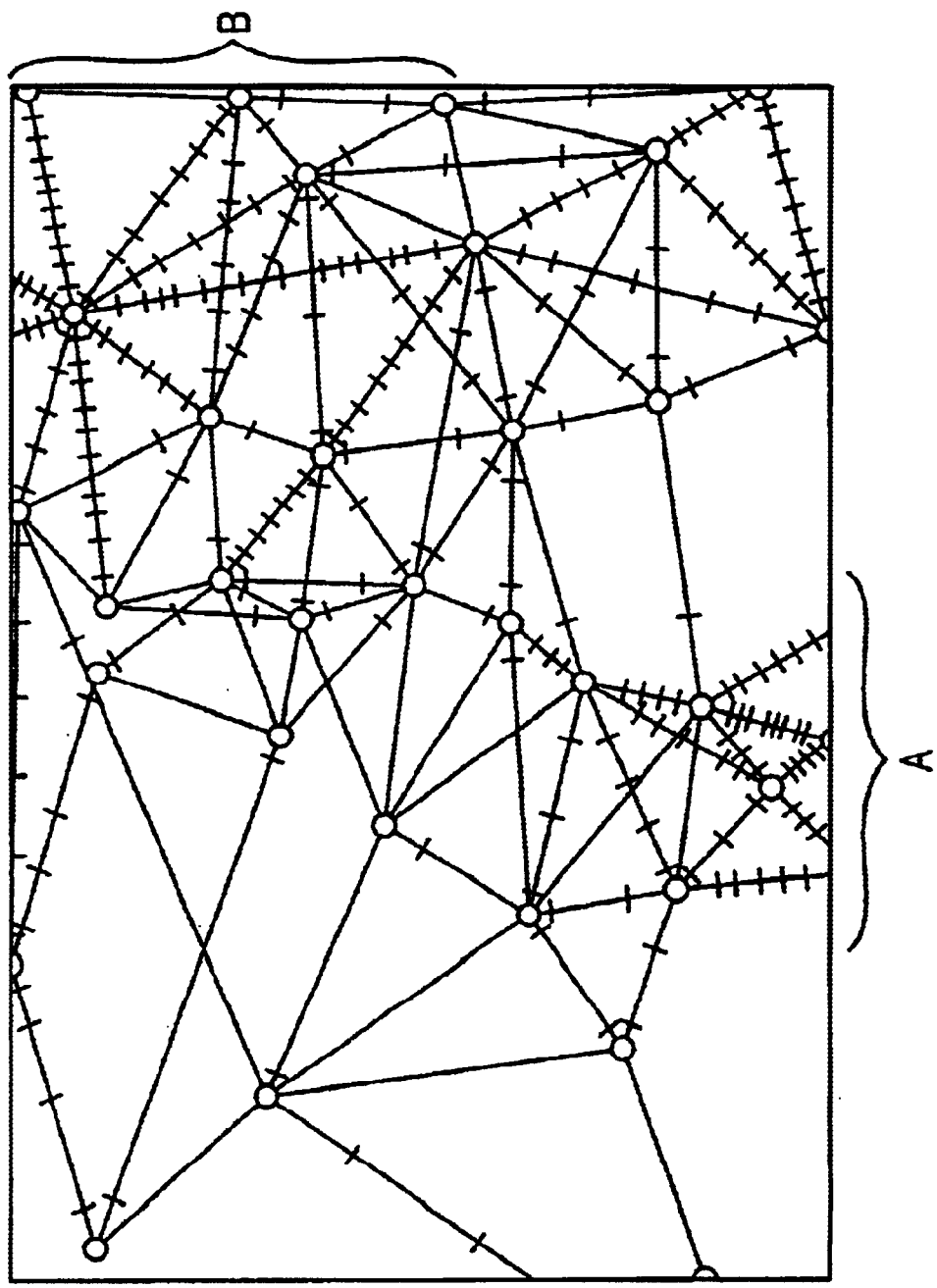
FIG. 1 illustrates plurality of base stations for a network of cellular antennas within a region is shown.

Cellular system switches serve customers in a wireless network system in a similar manner that wired system switches serve customers over public service telephone networks (P.S.T.N.). In a wireless network, however, the switch must locate a mobile phone that is not always in communication with the same cellular antennas, sites or regions served by a switch.

Determining the location of a mobile phone user is generally carried out through broadcasting methods where the mobile phone is paged and located within a wireless network. After receiving a call from a switch (e.g., another mobile phone or landline user), an antenna receives a call and carries information back to the switch and the switch determines the mobile phone user's/subscriber's identity and the called party information. Assuming the first mobile user is connecting with another mobile user, the switch must determine what cell site the second mobile user is in communication with (again through paging methods), the two mobile users are then placed into communication by the switch, or switches, serving the users. The switch, therefore, identifies mobiles users, cellular site locations, and the routing information for calls.

Cell sites, and/or cellular antennas, provide communication over the air with mobile phones and between mobile phones and switches. Cellular antennas are spread out within regions in order to create a network for mobile communications. In a typical wireless system, a switch may be assigned to serve a specific region having a plurality of dedicated antennas and base stations. A plurality of neighboring regions provide mobile communication through their respective switches and dedicated antenna arrangement. Only one switch may typically cover an entire region in small, lower populated areas or regions. Largely populated regions, however, may require the use a plurality of switches to handle increased communication traffic.

As the number of users grow to a certain region, additional base stations, antennas and switches may be added to the system. More wireless equipment and users cause a wireless region to become denser with wireless traffic and switching activity. With user growth, additional cell sites must be distributed and reassigned to switches within regions that have more than one switch.

The present methods for distributing cellular sites to switches within a region are based on actual use studies. Assignments may be made based on geography and/or actual use (e.g., wireless traffic). The way that wireless system administrators (e.g., designers, planner, operators, etc.) determine which cell sites belong to which switch can have a big impact on performance (e.g., efficiency and accuracy) of a system. Traffic and/or use determination are important for environments where fully defined borders are found. A fully defined border would be an area between two wireless service regions wherein a large amount of hand offs (e.g., wireless traffic being passed from one switch to another) go across borders.

Telecommunication switches generally have capacity limits. A switch's capacity may be absorbed by its having to facilitate hand-offs between neighboring switches within the cellular system, or by managing a hand off between cell sites. Each antenna only has a certain coverage area within a region. A hand-off generally occurs when a mobile user is becoming distanced from an antenna he is in communication with. When the system determines that the mobile user is within range of another antenna, the signal is typically handed-off to the second antenna. The hand-off is nearly seamless if both antennas are controlled by the same switch. If each antenna is assigned to different switches, however, then the hand-off may be delayed, thereby causing some inefficiencies, degraded communication quality, and occasional disconnection. Switch to switch hand-offs require processing capacity and time. Unfortunately, in poorly planned regions switch to switch hand-offs occur unnecessarily, tying up processing power in both switches and sometimes terminating a communication.

The present invention may employ use-based allocation to provide users and service providers with more efficiency with respect to transfer time and resource allocation where plural switches serve the same region. For example, one aspect of the present method may use contours representing wireless traffic between cellular sites within a wireless network to help wireless network stewards in defining switch-controlled optimum regions for wireless services (e.g., cellular phones, paging areas, exchange areas, problems areas, etc.) By processing network data on successive time intervals and using the data to visually trace the movement of wireless communication traffic throughout a network, more efficient reliable plural switch networks can be developed for wireless service regions.

Referring to FIG. 1, a illustration of a plurality of nodes, represented by dots, for a network of cellular antennas within a region are shown. The plurality of nodes in the figure represent cell sites, base stations and/or switches. Lines connecting the base stations represent the number of hand-offs occurring between antennas; a higher number of hash marks on the line indicates a higher number of hand-offs occurring between connected equipment. For example, each hash mark may represent 50 hand-offs between sites over a one hour time period. The data provided in FIG. 1 can allow network stewards, or a programmed/automated system, the ability to determine a suitable location for a border that divides the area shown into two regions, A and B, each region having a switch that control the base stations in the region, thereby minimizing the number of hand-offs across switch borders.

Figure 2:
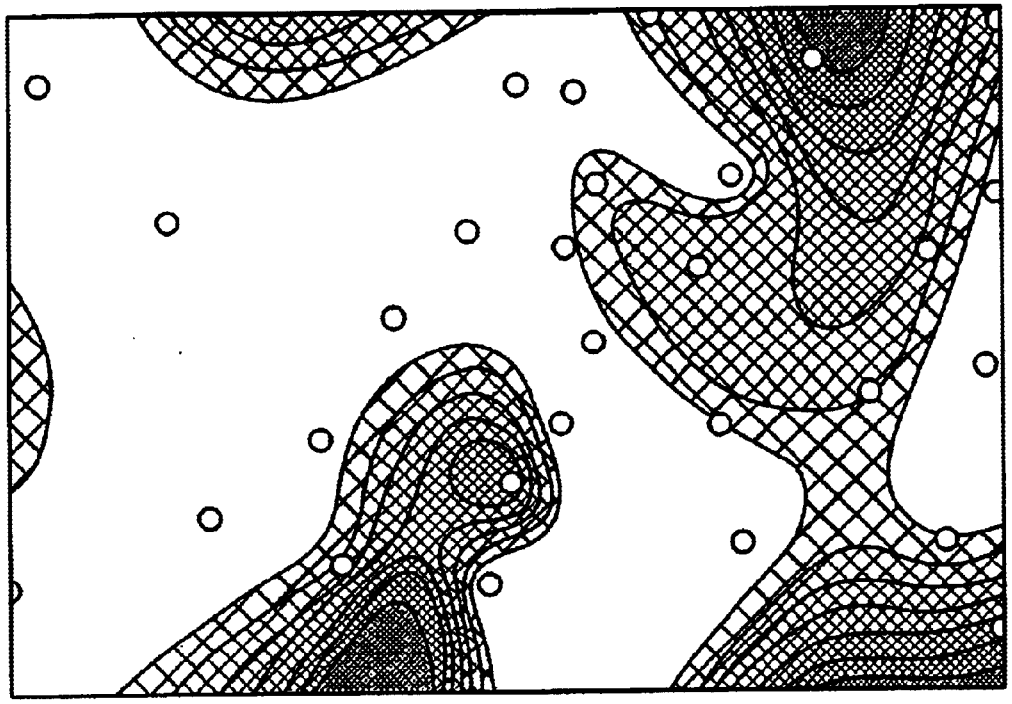
FIG. 2 illustrates the same base stations as shown in FIG. 1, however contours are employed to represent handoff activity, wherein darker contours represent higher handoff activity within the network.

FIG. 2 illustrates the same base stations, but contours are employed to represent handoff activity. The darker contours represent higher/denser handoff activity within the network. For example, equipment, such as base stations, in the completely white area are probably not handing off nearly as much as equipment shown by darker contours. Data that is readily available from service provider switches may reveal exact hand-off activity between cell sites. The number of hand offs that occur may be used to generate the contours.

Figure 3:
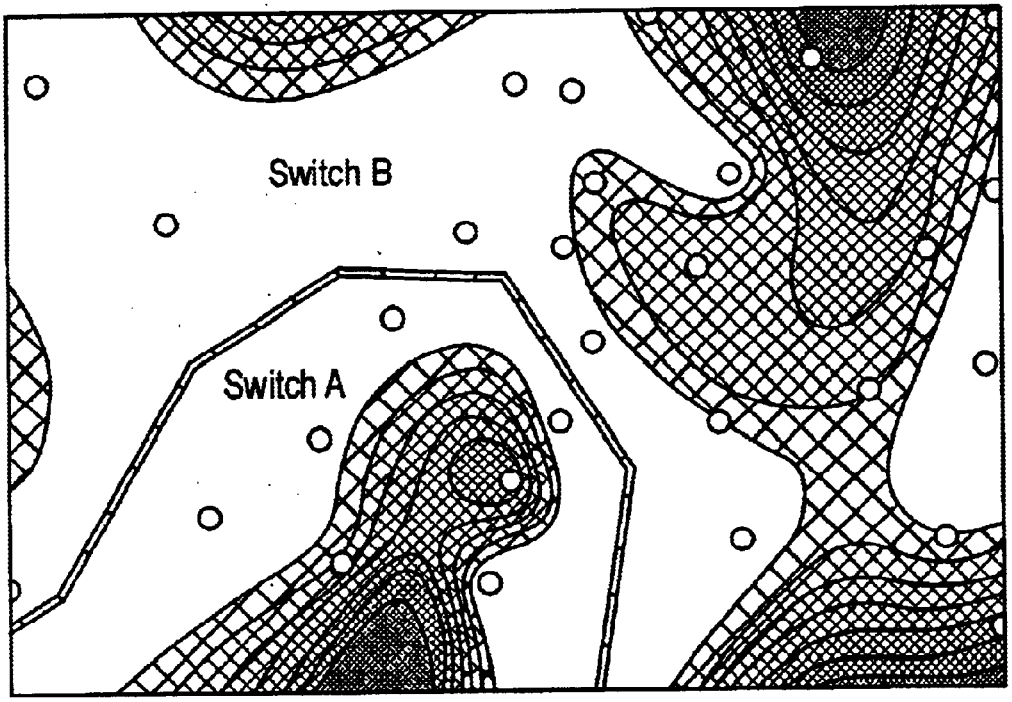
FIG. 3 illustrates a logical choice for placement of a border within the cellular region of FIGS. 1 and 2, wherein the border divides two high use (high hand-off activity) regions within the area defined by the map.

The contour map does not show the specific relationship between base stations as the line method does, however, a suitable location for a border is now made apparent as indicated in FIG. 3. In FIG. 3, a border has been placed along the contour representing the least amount of hand-off activity. Equipment falling on either side of the border may then be assigned to a switch. Switches A or B are shown in the figure to be assigned to each region on each side of the border. A suggestion of where a border may best fit is suggested based on the data of FIG. 2. The border tracts the lighter trafficked area in the graph. A further analysis of cell sites all along this border may refine system data points. Because several cell sites lye within the lightly shaded area, it is not known exactly on which side or region of these cell sites the border should fall. Planners may collect more specific information.

Two currently available sources of data, Cell Event Recording (CER) and Cell Traffic Statistics (CTS), may be used to determine contours within a cellular network. CER data may be used to produce the handoff lines between base stations, but has been shown, currently, to be a highly system intrusive process in terms of system resource use. As processing power within communication systems is enhanced, CER data may prove to be a more exact measurement of showing the number of hand-offs occurring between specific base stations pairs. CTS generally provides the number and type of hand-offs experienced by a particular cellular antenna (which can be aggregated on a base station basis). CTS data may usually collected continuously by the service provider and is therefore be readily available. File sizes for CTS are generally much smaller than CER and the process required to collect CTS data bears much less on a system's processor load.

The contour showing the least amount of handoff activity, such as the contour of FIG. 3, generally represents a good prospective location to place a border to define two separately controlled switch regions. Given the contour information, it becomes clear that a border would not be placed between cell site where there is an apparently high level of hand off activity between the sites. Proper border placement based on contour analysis helps stewards meet the objective of reducing hand offs between cell sites that belong to different switches.

Collected data on cell site reflect hand off activity occurring between plural cellular sites and can be used for border allocation among all the cell combinations within a region. Although collection of CER information is generally possible, under present system conditions not enough processor load is generally left to effectively run a program to collect detailed statistics without severally affecting the performance of a service provider's switch. Once processing capacity is improved CER information may provide the most accurate information to plot wireless traffic information. CTS information, however, can provide basic information on the number of hand-offs in and out of a cell site, but doesn't indicate from or to where. CTS information is, nevertheless, useful for plotting contour information.

Figure 4:
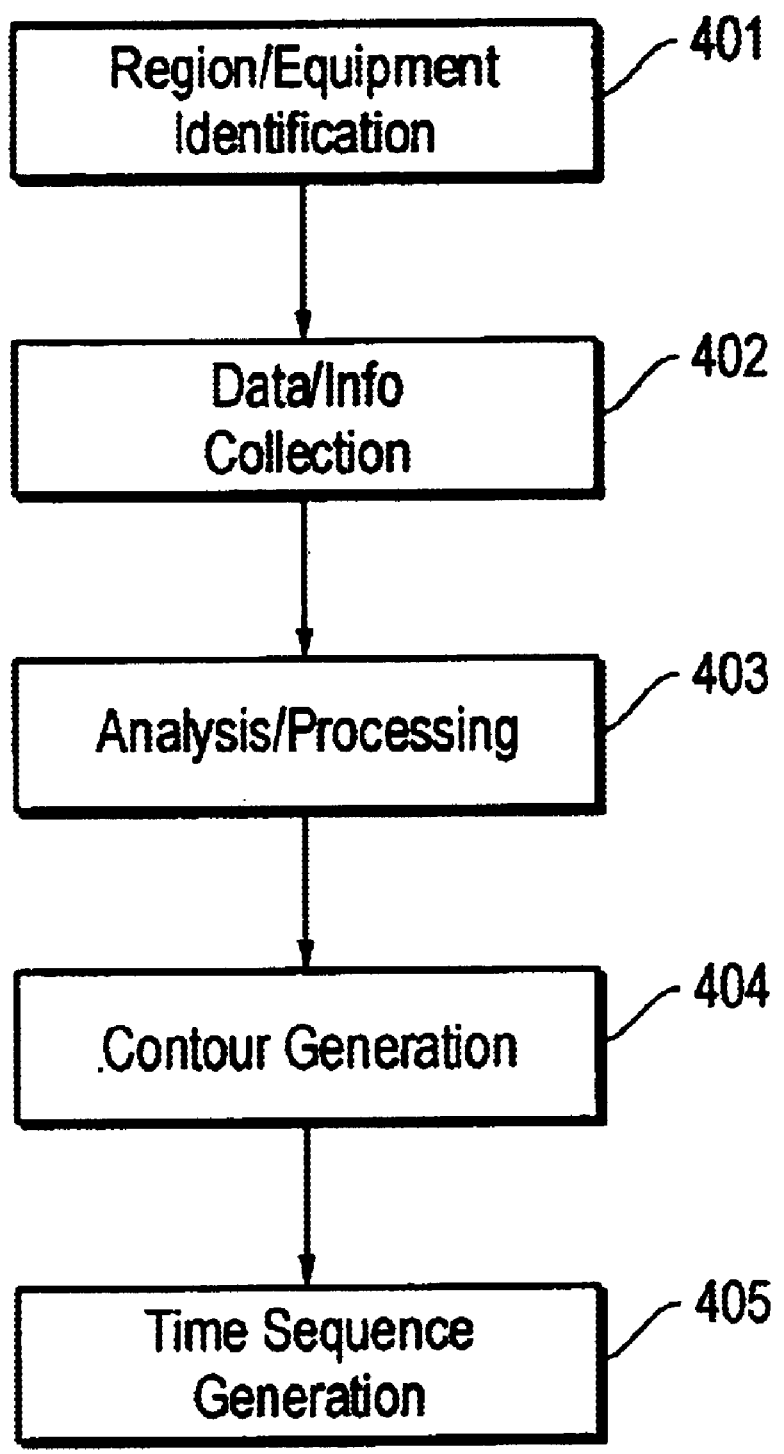
FIG. 4 is a flow diagram for a method of the invention.

Referring to the flow chart of FIG. 4, the first step of the present method is to identify a region 401 comprising a plurality of switches and cell sites in need of border optimization. Latitude and longitude information for each cell site may also be determined as part of this step. Lat./Long. information may generally be obtainable with equipment information (e.g, resident at the switch). Next, statistical data is collected 402 for the plurality of cell sites and switches within the region. The statistical data can be, for example, CER and/or CTS data, which provides cell traffic statistics within the network or system being investigated within the region. The data can included information directed to hand offs in and out of a cellular site. The statistical data and/or information (e.g. lat/long information) for all equipment in the regions is analyzed/processed 403. Analysis may be for any parameter or performance data. Contours are generated 404 defining regions for the parameter being investigated (e.g., hand-off information for purposes of cell redistribution and/or reassignment) based on analysis of the data and information.

Parameter traffic may be the sum of the hand-offs in and out of a cell. In general, however any network data may be investigated. As a final optional step, a time sequence generation 405 step can be implemented to the method to allow contours from different time intervals to be converted, for example, into a movie file, which would enable stewards to review the evolution of hand-off activity within regions through a period of time.

Redistribution of cell sites across available switches within a region may be investigated and/or proposed given information derived by the present invention. New statistical data defines traffic within the region once generated. Parameters such as hand-offs may be plotted on a map to illustrate areas of high hand-off and low hand-off activity. Other parameters of interest may, therefore, be: the amount of traffic meaning the number of cellular users or the activity within a region; hand-off information between switches; hand-offs between base station sites; and paging parameters (paging is where cell sites provide a locator signal to a cell phone that is receiving a call).

Paging is one example use of a wireless system application that would benefit from use of the present invention. During paging, regions are generally defined as location areas or paging areas. Whenever a mobile user is going to receive a call, a database tracks activities by the user and identifies that the user was last seen in a particular paging region near particular switch(es). All the cells within this paging region will transmit a broadcast message to alert the pager/phone. Paging information may allow stewards to determine how contours may best define paging areas within a region because paging areas can overlap into another switch region. It would be preferable to minimize the number of hand-offs between paging areas.

Figure 5:
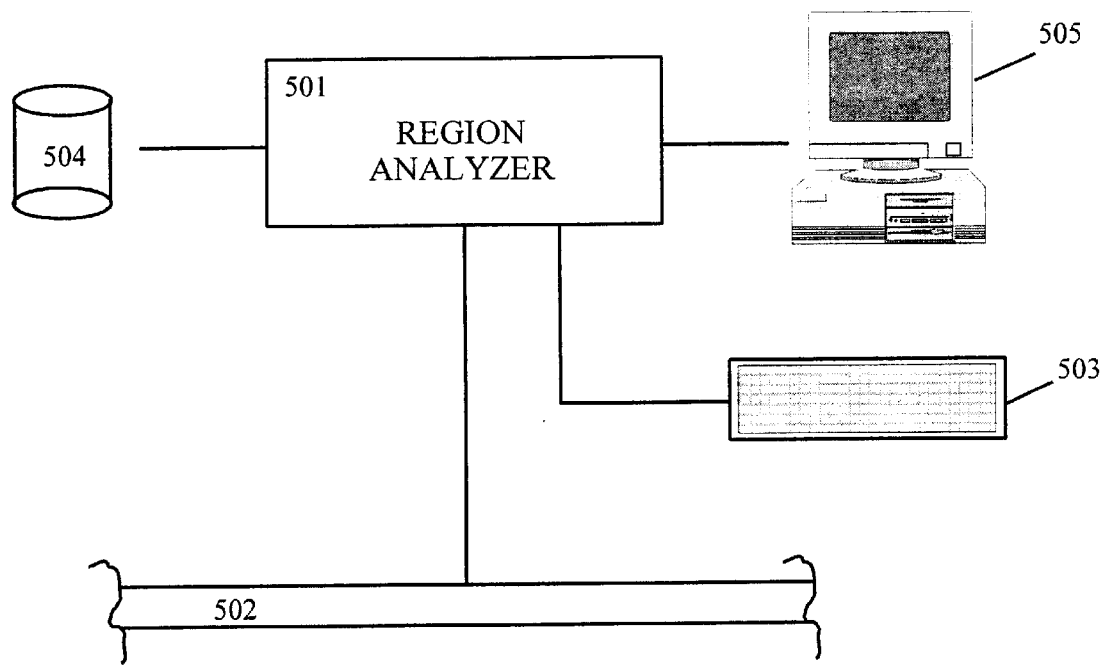
FIG. 5 is a block diagram of a system the present methods may be implemented within.

Referring to FIG. 5, a system 500 is identified for analyzing network data. A microprocessor 501 may be programmed to analyze network data from equipment (e.g., switches, cell sites, cellular antennas, etc.) within a region that has been identified for analysis. The microprocessor 501 may access statistical data directly from the equipment through a network 502. In the alternative, information may be entered into a computer by known means 503 (e.g., keyboard entry, etc.). Once the statistical information has been processed by the microprocessor 501 utilizing the method steps that may be accessible from software stored in memory 504, the results of the processed statistical information may be displayed, or otherwise rendered, at an illustrating or rendering mechanism 505 (e.g., monitor, printer, plotter etc.) The information may then be used by planners, designers, or the like, to redirect wireless operations (e.g., hand-off activity between switches), or may be implemented within a automated system to reassign cell sites and/or cellular antennas and/or switches.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of optimizing a wireless communication network, comprising the steps of:
   identifying a region comprising a plurality of switches and cell sites for switch border optimization within the wireless communication network;
   collecting statistical data for the plurality of cell sites and switches within the region; and
   using the statistical data for the plurality of cell sites and switches within the region to generate a proposed assignment of one or more of the cell sites to each switch of the plurality of switches based on one or more parameters being investigated.

2. The method of claim 1, wherein the parameter being investigated is hand-off information for purposes of cell site and switch redistribution and/or reassignment.

3. The method of claim 2, wherein the parameter is the sum of the hand-offs in and out of a cell.

4. The method of claim 3, wherein the number of hand-offs are plotted on a map to illustrate areas of higher hand-off and lower hand-off activity.

5. The method of claim 4, wherein time sequence generation is used to provide hand-offs occurring between cell sites and/or switches at different time intervals into a movie file.

6. The method of claim 5, wherein the movie file enables illustration of hand-off activity within the region throughout a specified time period.

7. The method of claim 6, wherein the movie file enables illustration of hand-off activity within the region throughout a specified time period, and wherein the assignments are defined as a number hand-offs between cell sites and/or switches plotted on a map.

8. The method of claim 1, wherein latitude and longitude information for each cell site is provided.

9. The method of claim 1, wherein the assignments are rendered as contours of varying scope on a map defining traffic within the region.

10. The method of claim 1, wherein the one or more parameters being investigated include: the amount of traffic meaning the number of cellular users or the activity within a region; hand-off information between switches; hand-offs between base station sites; and paging parameters.

11. The method of claim 1, wherein time sequence generation is used to provide contours from different time intervals into a movie file.

12. The method of claim 11, wherein the movie file enables illustration of hand-off activity within the region throughout a specified time period.

13. The method of claim 1 wherein time sequence generation is used to provide hand-offs from different time intervals into a movie file.

14. A method of optimizing a wireless communication network, comprising the steps of:

identifying a region comprising a plurality of switches and cell sites for switch border optimization within the wireless communication network;

collecting statistical data for the plurality of cell sites and switches within the region;

using the statistical data for the plurality of cell sites and switches within the region to generate proposed assignments of one or more of the cell sites to each switch of the plurality of switches, based on one or more parameters being investigated; and generating the assignments from the number of hand-offs between cell sites and/or switches.

15. A method for determining switch assignments for a plurality of cell sites within a region served by respective first and second switches, comprising the steps of:

identifying the region comprising the plurality of cell sites and first and second switches in need of switch border optimization;

collecting cell traffic statistical data for wireless equipment employed within the region; and generating proposed switch assignment information defining a first sub-region containing a multiple number of the cell sites to be controlled by the first switch, and a second sub-region containing the remaining cell sites to be controlled by the second switch, said switch assignment information generated by using the cell traffic statistical data.

16. The method of claim 15, wherein the proposed switch assignment information is generated as contours plotted on a map representing the region.

17. The method of claim 16, wherein the generation of contours comprises a proposed redistribution of cell sites to switches within the region.

18. The method of claim 15, wherein the cell traffic statistical data includes data related to hand-offs into and out of cellular antennas and/or a switches within a cellular network.

19. The method of claim 15, wherein the proposed switch assignment information is generated as hand-offs occurring between switches and/or cell sites.

20. The method of claim 19, wherein the generation of hand-offs comprises a proposed redistribution of cell sites to switches within the region.

21. A system for providing switch border analysis for a wireless telecommunication system having a plurality of cell sites and first and second switches, said system comprising:

a microprocessor for receiving statistical data collected from telecommunication hardware of the system serving a defined region, the microprocessor programmed to analyze the statistical data and provide switch border analysis results for the defined region that assign a subgroup of the plurality of cell sites to the first switch for control thereby, and assign the remaining cell sites to the second switch for control thereby; and a rendering mechanism for generating traffic contours within the defined region based on the statistical data.

* * * * *